(12) United States Patent
O'Connor et al.

(10) Patent No.: US 10,059,007 B1
(45) Date of Patent: Aug. 28, 2018

(54) FINGER-ALIGNED EXTENDABLE GRIPPING MECHANISMS FOR ITEM MANIPULATION

(71) Applicant: Amazon Technologies, Inc., Seattle, WA (US)

(72) Inventors: Michael James O'Connor, Charlestown, MA (US); Jude Royston Jonas, Hudson, NH (US); Felipe De Arruda Camargo Polido, North Reading, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/658,189

(22) Filed: Jul. 24, 2017

(51) Int. Cl.
*B66C 1/00* (2006.01)
*B25J 15/00* (2006.01)

(52) U.S. Cl.
CPC .................. *B25J 15/0028* (2013.01)

(58) Field of Classification Search
CPC .. B25J 15/0028; B25J 15/022; B25J 15/0052; B25J 15/0266; B66C 1/42; B66C 1/28; B66C 1/425; B66C 1/445
USPC ............... 294/118, 205, 2; 414/917
See application file for complete search history.

(56) References Cited

U.S. PATENT DOCUMENTS

| | | | | |
|---|---|---|---|---|
| 2,783,078 A | * | 2/1957 | Billner ................ | B66C 1/0212 294/2 |
| 3,306,646 A | * | 2/1967 | Flora, Jr. ............... | B66C 1/427 294/106 |
| 3,861,732 A | * | 1/1975 | Piper .................... | B66C 1/0281 294/2 |
| 4,723,353 A | * | 2/1988 | Monforte ............ | B25J 15/0052 414/737 |
| 5,280,982 A | * | 1/1994 | Kobayashi ............... | B66C 1/54 294/116 |
| 2011/0293397 A1 | * | 12/2011 | Lomerson, Jr. ...... | B25J 15/0052 414/800 |
| 2016/0309850 A1 | * | 10/2016 | Jurkovic ............. | A43D 119/00 |

FOREIGN PATENT DOCUMENTS

| | | | | |
|---|---|---|---|---|
| DE | 3010524 A1 | * | 9/1981 | ............... B66C 1/42 |
| EP | 0751092 A2 | * | 1/1997 | ............... B66C 1/24 |
| JP | 02024083 A | * | 1/1990 | |

* cited by examiner

*Primary Examiner* — Gabriela M Puig
(74) *Attorney, Agent, or Firm* — Kilpatrick Townsend & Stockton LLP

(57) ABSTRACT

Apparatuses including gripping mechanisms including extendable fingers and methods of manipulating items using the gripping mechanisms are described herein. An example apparatus may include a frame, a pair of carriages coupled to the frame and moveable by one or more drive units, a pair of fingers, and a set of linkages connecting the pair of fingers with the pair of carriages. The one or more drive units are operable to cause the fingers to move towards each other and to move away from each other.

20 Claims, 6 Drawing Sheets

FINGER-ALIGNED EXTENDABLE GRIPPING MECHANISMS FOR ITEM MANIPULATION

BACKGROUND

Many modern day industries are beginning to rely more and more on robotic manipulators such as robotic arms. Such robotic manipulators may function to increase repeatability of tasks, increase efficiency of production lines, and bring other benefits to their operators. These benefits may be especially realized when the robotic manipulators are instructed to perform tasks under the same conditions. For example, a robotic manipulator may include an end effector that is specialized to grasp a particular class of objects from known or fixed orientations. If different objects (e.g., those having different dimensions, surface properties, and other differences) or objects in unknown orientations are encountered, however, the robotic manipulator may be unable to achieve a grasp. Because of this, other systems that rely on the object being manipulated may be impacted and the benefits of the robotic manipulator may be minimized.

BRIEF DESCRIPTION OF THE DRAWINGS

Various examples in accordance with the present disclosure will be described with reference to the drawings, in which.

DETAILED DESCRIPTION

Figure 1:
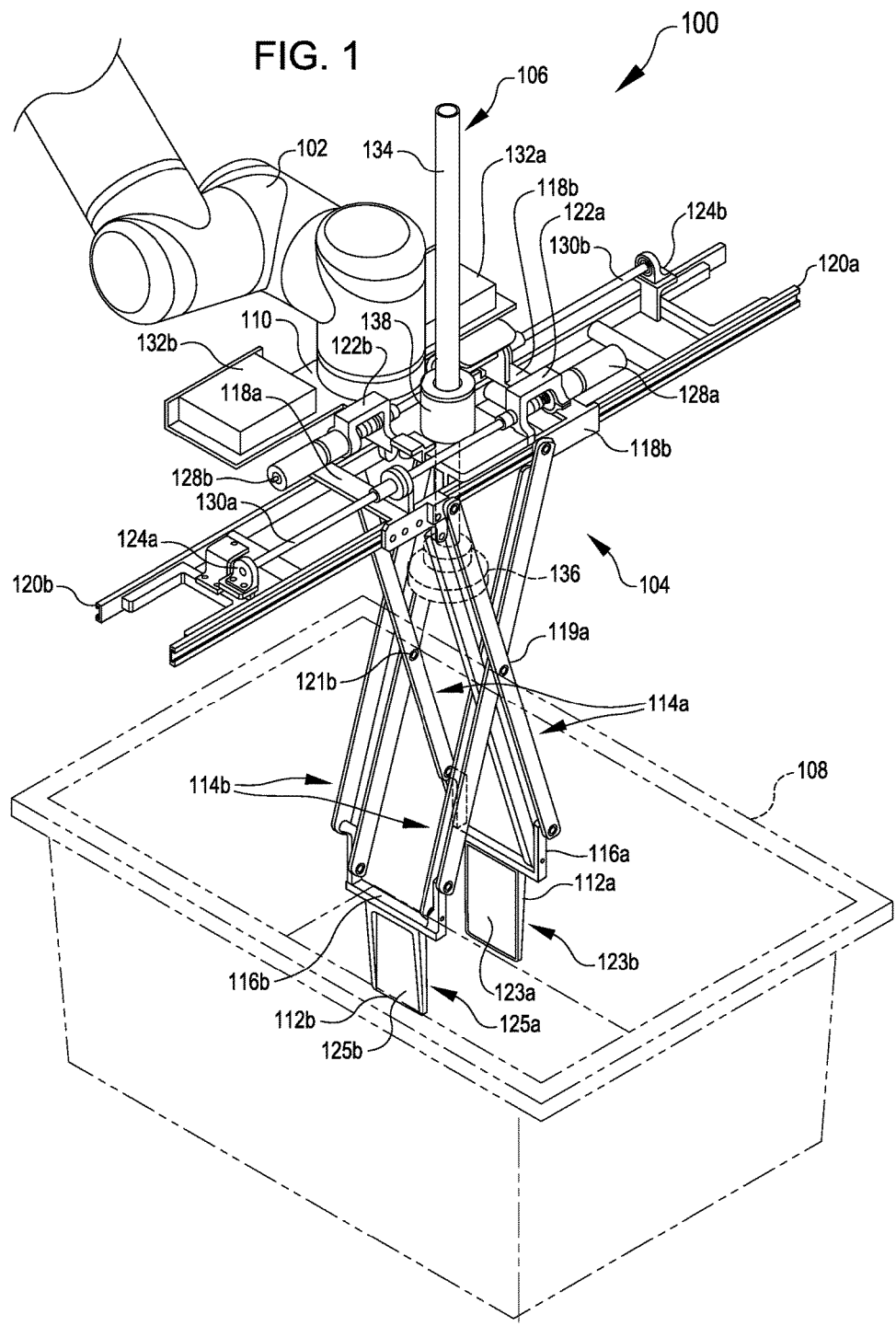
FIG. 1 illustrates a perspective view showing a first state of an item manipulation apparatus including a robotic manipulator and a finger-aligned extendable gripping mechanism, according to at least one example.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described.

Examples herein are directed to an apparatus including a pair of item gripping mechanisms for use with a robotic manipulator. A first item gripping mechanism can be a translating suction end effector. A second item gripping mechanism can be a finger-aligned extendable gripping mechanism. The two item gripping mechanisms can be vertically oriented (e.g. travel vertically to grasp items). The finger-aligned extendable gripping mechanism can include a pair of fingers that maintain a parallel orientation with respect to each other as the fingers are expanded and contracted to grasp items. The translating suction end effector can translate vertically above and within the pair of fingers. The finger-aligned extendable gripping mechanism may be particularly useful for grasping items of varying dimensions (e.g., less than an inch to many feet) in random orientations (e.g., a pile of random items). Given aspects of the design of the finger-aligned extendable gripping mechanism, the finger-aligned extendable gripping mechanism may be able to grasp items when the pile of items is held in a physical container (e.g., a rectangular item container with an open top). For example, the fingers have an elongate shape that enables their placement between items and walls of the container in order to grasp the items when the items are lodged against the walls. The pair of fingers are driven by a pair of drive units that is connected to the pair of fingers via a set of four-bar parallelogram linkages. Because the set of four-bar parallelogram linkages do not extend beyond outward-facing surfaces of the fingers, the outward-facing surfaces can be expanded to contact interior walls of the container without the linkages also contacting the interior walls. The arrangement of the linkages also enables the pair of fingers to grasp large or small items at the very bottom of the container. The pair of fingers can traverse this distance, i.e., from the top of the container to the bottom, by operating the drive units alone or by operation of the drive units in conjunction with the robotic manipulator. Because of the four-bar parallelogram linkages, the finger-aligned extendable gripping mechanism has a relatively long vertical stroke (e.g., multiple feet) and is collapsible into itself to have a narrow profile to enable other operations (e.g., grasping of items alone by the translating suction end effector).

Some inventory systems handle diverse item sets, e.g., dimensions, shapes, weights, surface properties, and characteristics may be different. In these systems, use of the finger-aligned extendable gripping mechanism together with the translating suction end effector may increase eligibility (e.g., percentage of inventory that can manipulated by a robotic manipulator) and reliability (e.g., a success rate for manipulating eligible items) as compared to traditional methods that do not utilize the finger-aligned extendable gripping mechanism together with the translating suction end effector. This may be a result of the finger-aligned extendable gripping mechanism and the translating suction end effector making three or more points of contact on the items. These multiple points of contact function to cage the items as they are manipulated.

Turning now to a particular example, a robotic manipulator such as a robotic arm is outfitted with a finger-aligned extendable gripping mechanism and a translating suction end effector. The finger-aligned extendable gripping mechanism includes a rectangular frame in a horizontal orientation and two elongate fingers held in a vertical orientation substantially parallel to each other. The frame defines carriage tracks on its opposing sides. Each moveable carriage is driven within the carriage tracks by a drive unit via a horizontally-orientated drive screw. Each finger is connected to one of the moveable carriages via a front four-bar parallelogram linkage and a rear four-bar parallelogram linkage. Distal ends of the front and rear four-bar parallelogram linkages are connected to top corners of each finger and proximal ends of the front and rear four-bar parallelogram linkages are connected to one of the carriages. Front four-bar parallel linkages for the two fingers are connected at a pair of front pivot points. Similarly, rear four-bar parallel linkages for the two fingers are connected at a pair of rear pivot points. In this configuration, horizontal translation of the carriages causes roughly vertical translation of the fingers. The translating suction end effector is disposed between the front and rear four-bar parallelogram linkages. In this manner, the finger-aligned extendable gripping mechanism can be used to grasp opposing sides of an item and the translating suction end effector can be used to grasp a top side of the item. These actions function to mechanically cage in the item.

Figure 2:
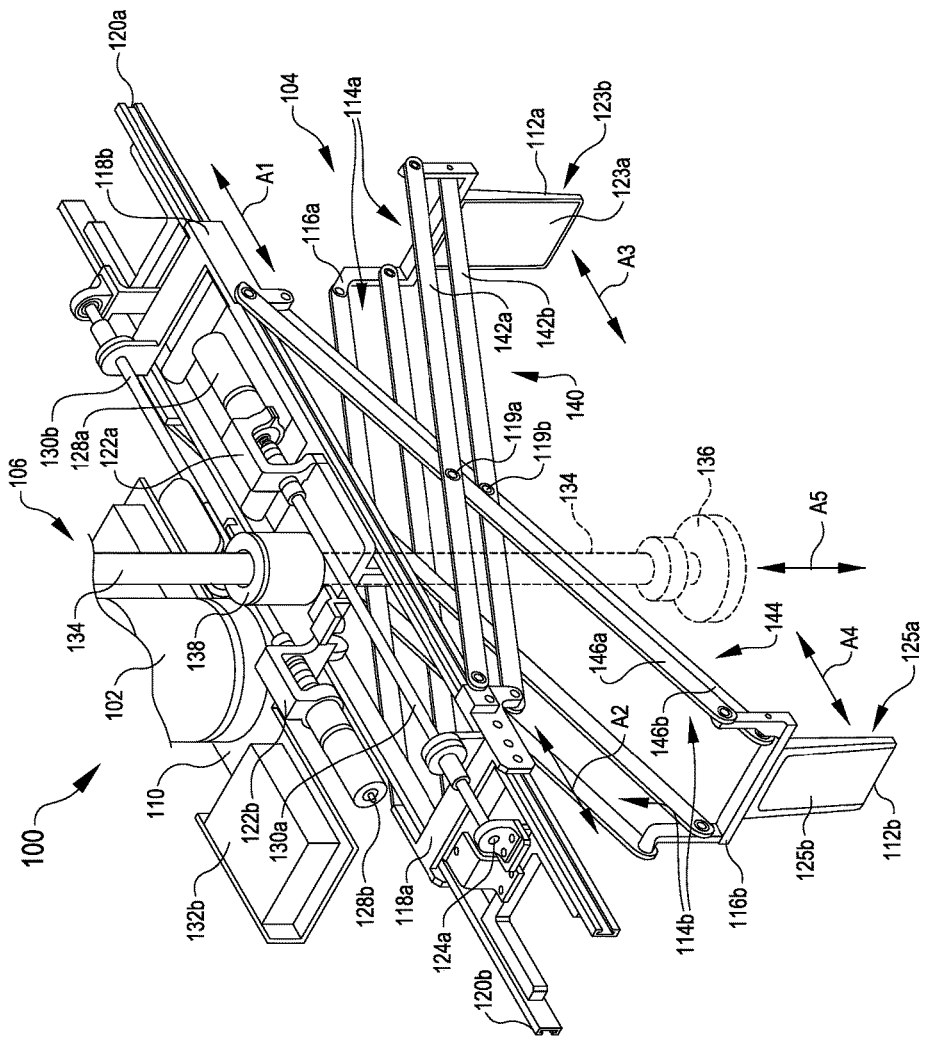
FIG. 2 illustrates a perspective view showing a second state of the item manipulation apparatus of FIG. 1, according to at least one example.

Turning now to the figures, FIGS. 1 and 2 illustrate an item manipulation apparatus 100 in various states, according to various examples. The item manipulation apparatus 100 includes a robotic manipulator 102 (a distal portion of which is illustrated), a first gripping mechanism 104, and a second gripping mechanism 106. The item manipulation apparatus 100 may be configured to grasp items of varying dimensions and in random orientations from an item container 108 using the first gripping mechanism 104 and the second gripping mechanism 106.

The robotic manipulator 102 may be any suitable material handling robot (e.g., Cartesian robot, cylindrical robot, spherical robot, articulated robot, parallel robot, SCARA robot, anthropomorphic robot, any other suitable robotic manipulator and/or robotic arm, automated guided vehicles including lift capabilities, vertical lift modules, and any other suitable material handling equipment that interacts with or otherwise handles objects) that is operable by a management device (e.g., a computing device or other electronic controller).

The robotic manipulator 102 may include any suitable type and number of sensors disposed throughout the robotic manipulator 102 (e.g., sensors in the base, in the arm, in joints in the arm, in an item gripping mechanism, or in any other suitable location). The sensors can include sensors configured to detect pressure, force, weight, light, objects, impedance slippage, and any other information that may be used to control and/or monitor the operation of the robotic manipulator 102, including an end effector. The sensors may include any suitable combination of sensors capable of detecting depth of objects, capturing RGB and other images of objects, scanning machine-readable information, capturing thermal images, detecting position and orientation of objects, and performing any other suitable sensing as described herein.

In some examples, depending on the application for the robotic manipulator 102, different gripping mechanisms including end effectors (e.g., end of arm tools) may be selected. Information about the end effectors or gripping mechanisms available may be organized in terms of grasping function. A grasping function may define functionally how an gripping mechanism is capable of manipulating an object. The grasping function may differ between gripping mechanisms with respect to capacities, categories, and physical limitations. Example categories of gripping mechanisms include: soft robotic end effectors, vacuum end effectors, electro-adhesion end effectors, and mechanical or electromechanical end effectors. Soft robotic end effectors may generally include flexible structures that may be manipulated between various orientations. The structures may include silicon bodies or other flexible material. Manipulation of the flexible material may be achieved through use of flexible actuators such as air muscles (e.g., contractile or extensional devices operated by pressurized air movement relative to filling or emptying a pneumatic bladder), electroactive polymers (e.g., polymers which change size or shape when stimulated by an electric field), or ferrofluids (e.g., fluids having suspended ferro-magnetic particles capable of altering a size or shape of the fluid volume when subjected to a magnetic field). Vacuum or suction end effectors may grasp objects using suction. Electro-adhesion end effectors can include an array of electrodes arranged along a flexible or rigid substrate capable of applying a charge (akin to static electricity) that can adhere an object to the substrate portions that are in contact with the object. Mechanical or electromechanical end effectors may include pinchers, claws, grippers, or other rigid components that may be actuated relative to one another for grasping an object. Other end effectors may also be utilized to facilitate additional grasping functions.

The management device may be configured to manage the operation of the robotic manipulator 102 (e.g., moving the robotic manipulator through different poses and orientations), the first gripping mechanism 104 (e.g., causing the first gripping mechanism 104 to grasp items), and the second gripping mechanism 106 (e.g., causing the second gripping mechanism 106 to grasp the items). In some examples, the management device can be distributed through one or more locations. For example, a first management device may be local to the robotic manipulator 102 and include hardware and firmware and a second management device may be remote from the robotic manipulator 102 and include software. The management device may include any suitable combination of software, firmware, processors, memory modules, specialized chips, sensors, and the like to implement the techniques described herein. In some examples, the management device receives instructions over a network from a server to perform the techniques described herein.

The first gripping mechanism 104, which may be considered a finger-aligned extendable gripping mechanism, includes a frame 110 by which the first gripping mechanism 104 is connected to the robotic manipulator 102. In some examples, the first gripping mechanism 104 and/or the second gripping mechanism 106 may be used without being connected to the robotic manipulator 102. For example, the first gripping mechanism 104 may be connected to a fixed structure such as a table and operated to grasp items. In some examples, the first gripping mechanism 104 may be used to hold items while a computer numerical control (CNC) machine performs operations such as milling or turning operations on the items. The first gripping mechanism 104 also includes a first finger 112*a* and a second finger 112*b*. The first finger 112*a* is connected to the frame 110 via a first pair of linkages 114*a*. In particular, distal ends of the first pair of linkages 114*a* are connected to a first finger frame 116*a* of the first finger 112*a*. Proximal ends of the first pair of linkages 114*a* are connected to a first carriage 118*a* supported by the frame 110. The second finger 112*b* is likewise connected to the frame 110 via a second finger frame 116*b*, a second pair of linkages 114*b*, and a second carriage 118*b* supported by the frame 110. Front linkages of the first pair of linkages 114*a* and the second pair of linkages 114*b* are connected at front pivot points 119*a*, 119*b*. Rear linkages of the first pair of linkages 114*a* and the second pair of linkages 114*b* are connected at rear pivot point(s), 121*b*.

The first finger 112*a* includes a first inward-facing surface 123*a* and a first outward-facing surface 123*b*. The second finger 112*b* includes a second inward-facing surface 125*a* and a second outward-facing surface 125*b*. The fingers 112, the frame 110, and the linkages 114 may be formed from a rigid material. The fingers 112 may be retractable (e.g., telescoping or otherwise extendable and retractable). The inward-facing surfaces 123*a*, 125*a* may be coated with material having a high-coefficient of friction. This may improve gripping of items by the fingers 112. The outward-facing surfaces 123*b*, 125*b* may be coated with material having a low-coefficient of friction. In some examples, the inward-facing surfaces 123a, 125a and the outward-facing surfaces 123b, 125b may be about parallel. The outward-facing surfaces 123b, 125b may be about vertical or have some other profile that corresponds to the walls of the item container 108. This may enable the fingers 112 to glide against the walls of the item container 108 in order to grasp items abutting the walls.

In some examples, each finger 112 includes a compliant tip disposed at a distal end of the finger 112. The compliant tip can be integrated into the distal end of the finger 112, detachably coupled to the finger 112, and/or may be included in a finger attachment (e.g., a structure that connects to the finger 112 and includes the compliant tip). In any event, each compliant tip includes a hook structure (e.g., a curved, sloped, or otherwise protruding structure) that is oriented towards the other compliant tip mounted on the other finger 112. In this manner, the hook structures of the two compliant tips face each other. The compliant tips include an active mechanism or a passive structure that enables one or more directions of compliance. For example, springs can be biased between the finger attachment and the finger 112 and aligned with a longitudinal axis of the finger 112. In this arrangement, the spring-loaded joints enable compliance of the compliant tip in a direction along the longitudinal axis. To grasp an item, the compliant tips can be positioned on opposite sides of the item. The fingers 112 are contracted towards each other until the compliant tips contact with bottom edges of the item. This contact can cause the compliant tips to extend underneath the item. At about the same time, the inward facing surfaces 123a, 125a of the fingers 112 will contact the opposite sides surfaces of the item. When appropriate, the second gripping mechanism 106 can be used to provide another grasp along a top surface of the item. In this manner, the item may be mechanically supported by at least three points of contact (e.g., the two opposite side surfaces and the top surface) and possibly five points of contact (e.g., two points on a bottom side surface, the two opposite side surface, and the top surface).

Compliance of the compliant tips may be achieved passively and/or actively. In some examples, the finger attachments contribute to the compliance of the compliant tips. For example, the finger attachments can include elements to create active compliance between the finger attachments and the fingers 112.

In some examples, the compliant tips and/or the finger attachments may have characteristics of a compliant actuator. A compliant actuator may allow deviations from its own equilibrium position, depending on the applied external force or force applied by an active mechanism. The equilibrium position of a compliant actuator may be defined as the position of the actuator where the actuator generates zero force or zero torque. Compliance is the opposite of stiffness. Thus, a stiff actuator may be one which does not deviate from its own equilibrium position. In some examples, actuators may have variable stiffness, adjustable stiffness, and/or controllable stiffness. Examples of compliant actuators include passive compliant actuators that contain an elastic or motive element, e.g. a spring which can store energy. Examples of compliant actuators also include those with active compliance, where a mechanism of an otherwise stiff actuator mimics the behavior of the elastic or motive element. In some examples, active compliance can be adapted during normal operation.

Generally, the frame 110 is a rigid structure that supports components of the first gripping mechanism 104 and, in some examples, components of the second gripping mechanism 106. For example, the frame 110 includes a carriage track 120, illustrated as a front carriage track 120a and a rear carriage track 120b. The carriages 118 are slidably coupled to the frame 110 via the carriage tracks 120. The frame 110 also includes drive unit support structures 122a, 122b and drive gear support structures 124a, 124b. The drive unit support structures 122a, 122b support drive units 128a, 128b. The drive gear support structures 124a, 124b support drive gears 130a, 130b.

The drive units 128 can be any suitable unit configured to drive the carriages 118 (e.g. the drive gears 130 or otherwise). For example, the drive units 128 can be electric motors, pneumatic motors, cable driven motors, and other similar rotary motors. In some examples, the drive units 128 can be linear or rotary actuators, which may be hydraulic, electric, pneumatic, and driven in any other suitable manner. Depending on the application, the drive units 128 can be connected to the carriages 118 via the drive gears 130 in order to produce linear movement of the carriages 118. For example, the drive gears 130 can be ball screws, lead screws, worm gears, or other similar threaded gears, and the drive units 128 can move the carriages 118 by rotating the drive gears 130. Use of certain drive gears may enable drive-back ability of the first gripping mechanism 104. This may be desirable to add controllable compliance to the first gripping mechanism 104. In some examples, the controllable compliance may also be achieved based on sensor data from the first gripping mechanism 104 and/or the robotic manipulator 102 relating to impedance, voltage, current, and other similar parameters relating to grasping and operation of the drive units 128. In some examples, the first gripping mechanism 104 may include other sensors that output information useable to achieve controllable compliance or otherwise measure force exerted by the fingers 112. For example, strain gauges can be used to measure strain on one or more of the pair of linkages 114, force sensors can be used to measure force exerted by the fingers 112, and position sensors can be used measure position of the drive units 128, the carriages 118, the linkages 114, and/or the drive gears 130. Data output from the sensors described herein can be used to measure a force exerted by the fingers 112, which may be used to achieve controllable compliance.

In some examples, the drive gears 130 and drive units 128 may be oriented vertically (e.g., opposite as shown) and extend between one of the finger frames 116 and the frame 110. In this example, other modifications may be made to the carriages 118 and the frame 110 to accommodate such a configuration. In some examples, the pairs of linkages 114 may be connected to each other at the pivot points 119 and 121. In this example, the drive gears 130 and the drive units 128 may extend between the frame 110 and the connections at the pivot points 119 and 121. For example, the drive gears 130 and the drive units 128 may be oriented in the same or similar plane similarly as the first pair of linkages 114a. In this example, other modifications may be made to the carriages 118 and the frame 110 to accommodate such a configuration.

As illustrated in FIG. 2, the drive units 128a, 128b may be controllably by drive unit control modules 132a, 132b. The drive unit control modules 132 may include any suitable combination of hardware, firmware, and/or software to control the drive units 128. In some examples, a single control module 132 controls both drive units 128a, 128b. As introduced herein, the drive units 128 are configured to cause horizontal movement of the carriages 118, illustrated by arrows A1 and A2. This horizontal movement is translated by the linkages 114 via the pivot points 119 and 121 into generally vertical movement of the fingers 112, illustrated by arrows A3 and A4. Because of the configuration of the linkages 114, the fingers 112 remain aligned with each other (e.g., parallel to each other) and perpendicular to a portion of the frame including the carriage tracks 120. In this example, the drive units 128 are operable to cause the fingers 112 to move towards each other (e.g., close the fingers 112), to move away from each other (e.g., open the fingers 112), and to translate the fingers 112 (e.g., move both fingers 112 in the same direction at about the same rate). In some examples, the general vertical movement of the fingers 112 may be characterized as diagonal movement along a pair of opposing diagonal curves. In this manner, the fingers 112 can move vertically down and towards each other and/or vertically up and away from each other. Even during this movement, the fingers 112 remain in their fixed alignment.

Because each finger 112 is connected to its own drive unit 128, the fingers 112 can be driven independently. For example, the first finger 112a can be driven towards or away from the second finger 112b, with the second finger 112b remaining stationary. In some examples, both drive units 128 may be operated to cause the fingers 112 to translate horizontally, e.g., to the left or to the right. In some examples, this may shift a first grasp axis of the first gripping mechanism 104 with respect to a second grasp axis of the second gripping mechanism 106. For example, the second grasp axis may be defined as extending longitudinally thorough a center point of the rod 134. The first grasp axis may be defined as extending through a midpoint of a line extending horizontally between the inward-facing surfaces 123a, 125a of the two fingers 112. In most cases, the two grasp axes may extend vertically and may be aligned. However, in some examples, it may be beneficial to offset the first grasp axis. For example, if a center of mass of an item is known to the item manipulation apparatus 100 and is offset from the center of the item, the first grasp axis can be shifted to align the second grasp axis with the offset center of mass.

In some examples, a single drive unit 128 is connected to drive both fingers 112. In this example, a one or more rods may be used to connect the pivot points 119 with the pivot points 121. In this example, the fingers 112 may not move independent of each other, but instead one finger 112 may move towards and away from the other.

The second gripping mechanism 106 is an example of a translating suction end effector. In this example, the second gripping mechanism 106 is supported by the frame 110 and includes a rod 134, a suction head 136, and a translator mechanism 138. The translator mechanism 138 retains the second gripping mechanism 106 via the rod 134. The translator mechanism 138 is operable to release and retain the rod 134 to enable translation of the suction head 136, illustrated by arrow A5. The suction head 136 is any suitable structure (e.g., one or more vacuum devices) capable of applying suction to a surface of an item. The second gripping mechanism 106 is disposed between the first pair of linkages 114a and the second pair of linkages 114b. In this manner, the second gripping mechanism 106 can physically contact an item (e.g., at a top surface) while the first gripping mechanism 104 contacts the item (e.g., at opposing side surfaces).

As illustrated in additional detail in FIG. 2, each linkage of the pairs of linkages 114 may be defined as a four-bar parallelogram linkage. For example, a first front linkage 140 of the first pair of linkages 114a may include a first upper link 142a and a first lower link 142b held in a parallel orientation. Distal ends of the first upper link 142a and the first lower link 142b may be pivotably connected to the first finger frame 116a. Proximal ends of the first upper link 142a and the first lower link 142b may be pivotably connected to the first carriage 118a. Similarly, a second front linkage 144 of the second pair of linkages 114b may include a second upper link 146a and a second lower link 146b held in a parallel orientation. Distal ends of the second upper link 146a and the second lower link 146b may be pivotably connected to the second finger frame 116b. Proximal ends of the second upper link 146a and the second lower link 146b may be pivotably connected to the second carriage 118b. The first upper link 142a and the second upper link 146a may be pivotably connected at the front pivot point 119a. Likewise, the first lower link 142b and the second lower link 146b may be pivotably connected at the front pivot point 119b. While not labeled, first and second rear linkages from the first pair of linkages 114a and the second pair of linkages 114b may be connected to the fingers 112 and the carriages 118 and to each other in a similar manner.

Figure 3:
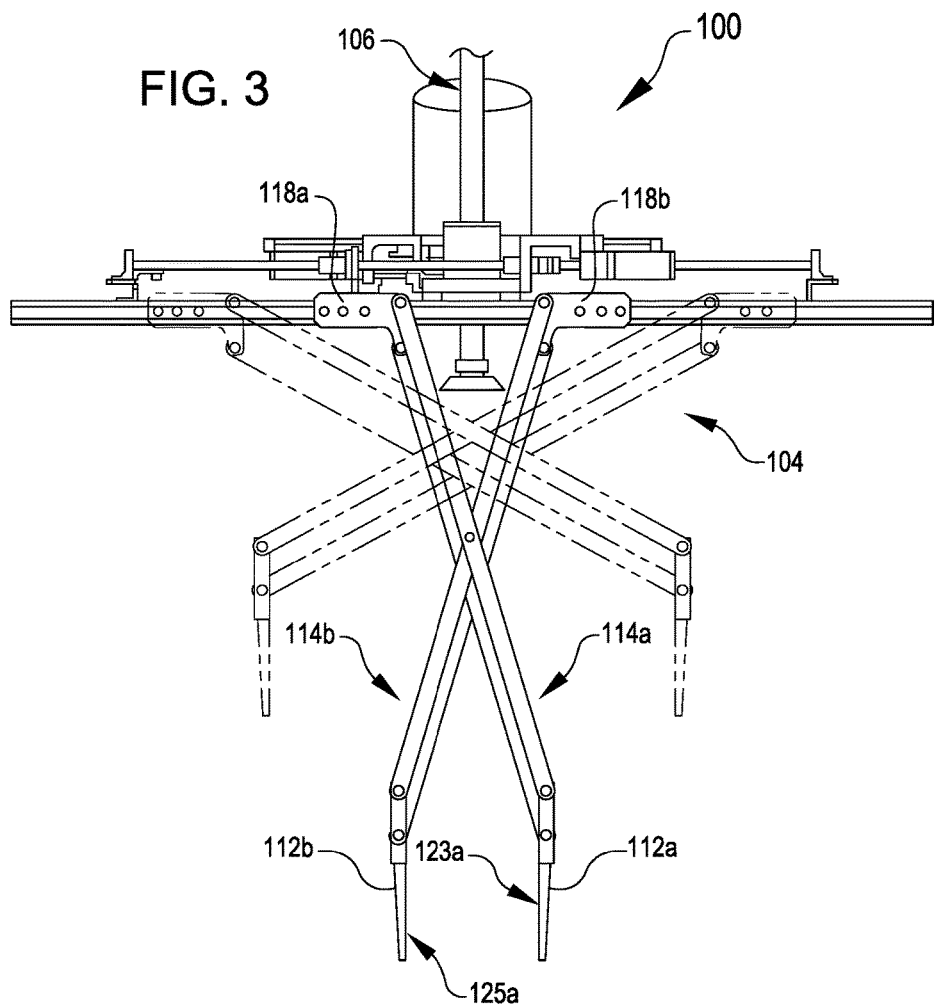
FIG. 3 illustrates a side view showing various states of the item manipulation apparatus of FIG. 1, according to at least one example.

FIG. 3 illustrates a side view showing various states of the item manipulation apparatus 100, according to at least one example. In particular, FIG. 3 illustrates at least two states, an partially-extended state shown in solid lines and a partially-retracted state shown in phantom lines, of the first gripping mechanism 104. In some examples, horizontal movement of the carriages 118 causes the pairs of linkages 114 to extend and contract. In some examples, in a fully-extended state, the inward-facing surfaces 125a, 123a may physically contact each other. In a fully-contracted state, top surfaces of the links in the pairs of linkages 114 may be about parallel with the frame 110. This state may define the maximum width between the fingers 112.

Figure 4:
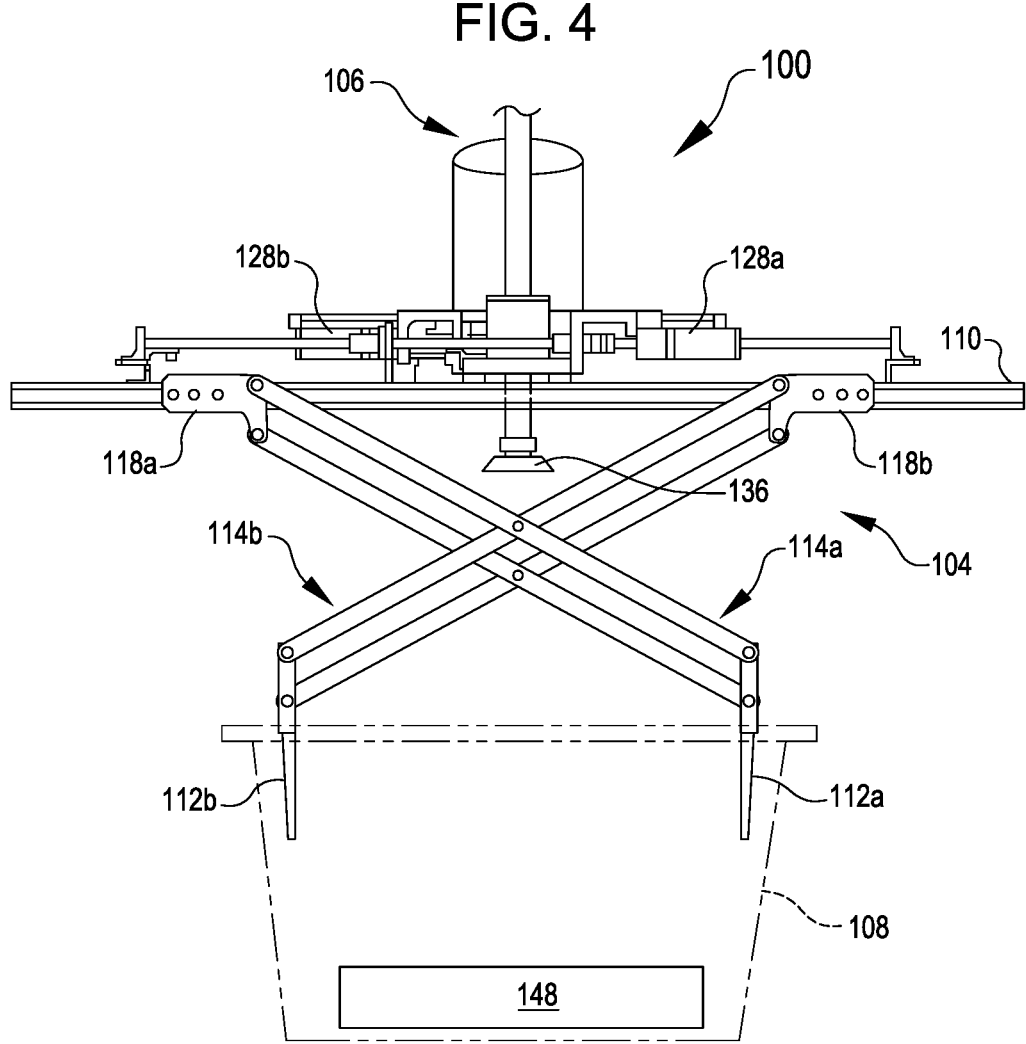
FIG. 4 illustrates a side view showing a preparation state of the item manipulation apparatus of FIG. 1 with respect to an item container, according to at least one example.
Figure 5:
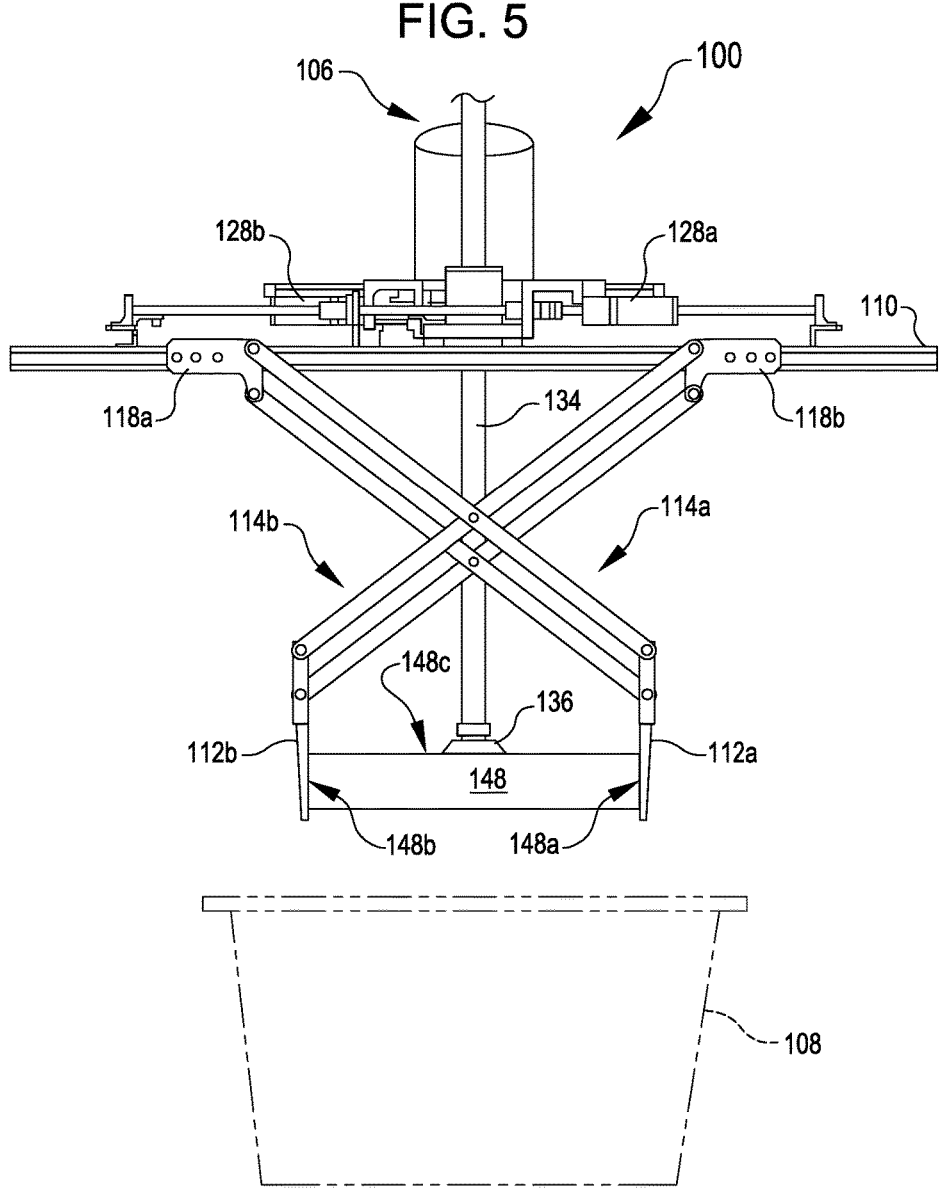
FIG. 5 illustrates a side view showing a manipulation state of the item manipulation apparatus of FIG. 1 with respect to an item container, according to at least one example.

FIGS. 4 and 5 illustrates side views respectively showing a preparation state and a manipulation state of the item manipulation apparatus 100, according to various examples. In particular, FIGS. 4 and 5 illustrate use of the first gripping mechanism 104 in conjunction with the second gripping mechanism 106 to grasp an item 148 from the item container 108.

In FIGS. 4 and 5, the item 148 is a rectangular box. The item 148, however, can be any suitable object capable being manipulated by the item manipulation apparatus 100. Depending on system in which the item manipulation apparatus 100 is implemented, the item 148 may represent a wide variety of different items having different characteristics. In some examples, the item 148 may be any suitable item such as, for example, personal electronic devices, computers, recreational equipment, food products, television sets, clothing, household supplies, automotive parts, appliances, books, and any other suitable object capable of being manipulated by the item manipulation apparatus 100.

In the preparation state illustrated in FIG. 4, the drive units 128 have been operated to drive the carriages 118 away from each other. This movement of the carriages 118 has caused the fingers 112 to open or otherwise move away from each other. In some examples, the preparation state is determined based on sensor information such as computer vision data to determine how to wide to open the fingers 112 and where to position the first gripping mechanism 104 in order to prepare to grasp the item 148 within the item container 108. Also in the preparation state, the suction head 136 of the second gripping mechanism 106 is in a retracted position.

In the manipulation state illustrated in FIG. 5, the drive units 128 have been operated to drive the carriages 118 towards each other. This movement of the carriages 118 has caused the fingers 112 to move towards each other at least until the fingers 112 have contacted opposing sides 148a, 148b of the item 148. Similarly, the suction head 136 has been translated at least until the suction head 136 has contacted a top side 148c of the item 148. In some examples, the fingers 112 and the suction head 136 contact the item 148 simultaneously (e.g., within some threshold time value of each other) or at different times. For example, assume that an item 148 is lodged in a corner of the item container 108 at a location unreachable by the first gripping mechanism 104. In this example, the first gripping mechanism 104 can be retracted (e.g., the fingers 112 moved towards the frame 110) and the second gripping mechanism 106 can be used dislodge the item 148. Once dislodged and while supported by the suction head 136, the fingers 112 can be contracted to cage in the item 148. In a different example, the first gripping mechanism 104 can be used to grasp an item 148 at a first time, and the second gripping mechanism 106 can be used to grasp the item 148 at a later time. Use of the first gripping mechanism 104 in connection with the second gripping mechanism 106 functions to cage in the item 148 between at least three points of contact. This may, in some examples, enable more secure manipulation of the item 148 as compared to other approaches that use fewer points of contact.

Figure 6:
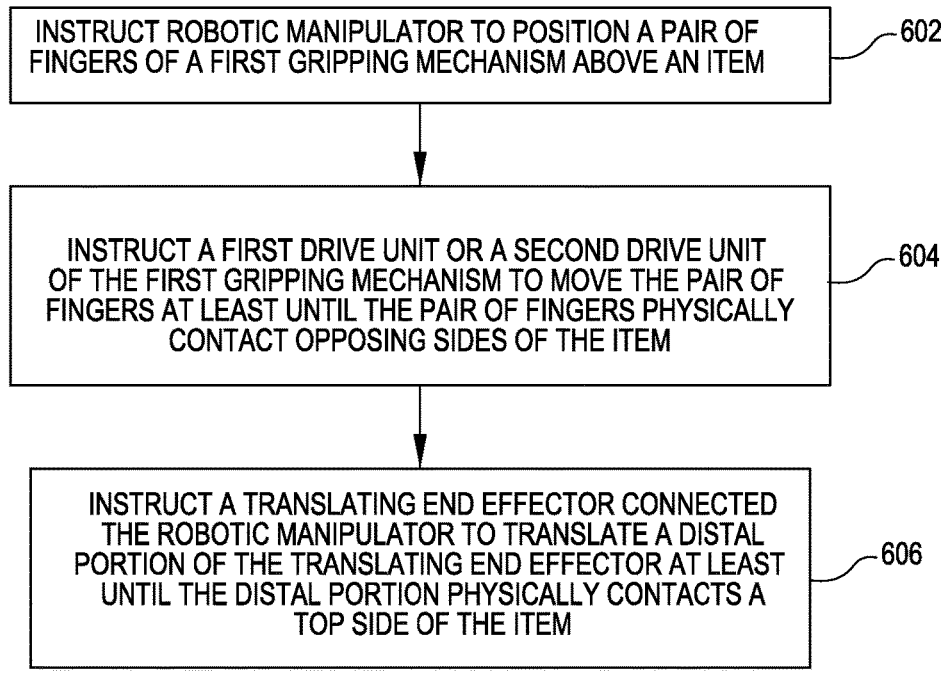
FIG. 6 illustrates a flowchart depicting a process for manipulating an item, according to at least one example.

FIG. 6 illustrates an example flow diagram showing a process 600 as described herein. The process 600 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

FIG. 6 illustrates a flow diagram depicting the process 600 for implementing techniques relating manipulating an item, according to at least one example. The management device of the item manipulation apparatus 100 may perform the process 600.

The process 600 may begin at 602 by instructing a robotic manipulator to position a pair of fingers of a first gripping mechanism above an item.

At 604, the process 600 may include instructing a first drive unit or a second drive unit of the first gripping mechanism to move the pair of fingers at least until the pair of fingers physically contact opposing sides of the item. In some examples, the first drive unit and the second drive unit may be connected to the pair of fingers via a pair of carriages and a set of scissor linkages.

At 606, the process 600 may include instructing a translating end effector connected the robotic manipulator to translate a distal portion of the translating end effector at least until the distal portion physically contacts a top side of the item. In some examples, the distal portion is a suction end effector.

The various examples further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Operating environments can include a variety of data stores and other memory and storage media as discussed above. These can reside in a variety of locations, such as on a storage medium local to (and/or resident in) one or more of the computers or remote from any or all of the computers across the network. In a particular set of examples, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate examples may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various examples.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Preferred examples of this disclosure are described herein, including the best mode known to the inventors for carrying out the disclosure. Variations of those preferred examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. An apparatus, comprising:
    a robotic manipulator; and
    a gripping mechanism connected to the robotic manipulator and configured to grasp an item using a grasping function, the gripping mechanism comprising:
        a frame comprising a first track and a second track;
        a first carriage mounted for sliding along the first track, the first carriage configured to move along the first track via a first drive unit;
        a second carriage mounted for sliding along the second track, the second carriage configured to move along the second track via a second drive unit;
        a first linkage connected to the first carriage at a proximal end and connected to a first finger at a distal end; and
        a second linkage connected to the second carriage at a proximal end and connected to a second finger at a distal end, the first linkage and the second linkage being pivotably connected at a position intermediate the distal ends and the proximal ends of the first linkage and the second linkage,
    wherein at least one of the first drive unit or the second drive unit is operable to move at least one of the first carriage along the first track or the second carriage along the second track such that:
        the first carriage and the second carriage move towards each other so that the first finger and the second finger move towards each other;
        the first carriage and the second carriage move away from each other so that the first finger and the second finger move away from each other; and
        the first carriage and the second carriage translate together with respect to the frame so that the first finger and the second finger maintain a substantially fixed spacing.

2. The apparatus of claim 1, wherein the frame is elongate along a first axis of the gripping mechanism, and the first finger and the second finger are moveable along a second axis of the gripping mechanism that is normal to the first axis.

3. The apparatus of claim 2, further comprising:
a third four-bar parallelogram linkage opposite the first four-bar parallelogram linkage; and
a fourth four-bar parallelogram linkage opposite the second four-bar parallelogram linkage.

4. The apparatus of claim 1, wherein the first linkage is a first four-bar parallelogram linkage, and the second linkage is a second four-bar parallelogram linkage.

5. The apparatus of claim 1, wherein first translation of the first carriage in a horizontal direction along a horizontal axis causes second translation of the first finger in a diagonal direction along a diagonally curved axis that is oriented between the horizontal axis and a vertical axis.

6. An apparatus, comprising:
a gripping mechanism configured to grasp an item using a grasping function, the gripping mechanism comprising:
a frame;
a carriage mounted for sliding along the frame, the carriage configured to move along the frame via a drive unit; and
a pair of four-bar parallelogram linkages, with first proximal ends pivotably connected to the carriage and second proximal ends pivotably connected to the frame, and distal ends pivotably connected to a pair of fingers,
wherein the drive unit is operable to move the carriage along the frame such that:
the carriage moves in a first direction so that a first finger of the pair of fingers moves towards a second finger of the pair of fingers, with the pair of fingers remaining substantially parallel; and
the carriage moves in a second direction so that the first finger moves away from the second finger, with the pair of fingers remaining substantially parallel.

7. The apparatus of claim 6, wherein fingers of the pair of fingers are oriented opposite each other such that inward-facing surfaces of the pair of fingers contact opposing sides of the item when the gripping mechanism uses the grasping function to grasp the item.

8. The apparatus of claim 6, further comprising a robotic manipulator, the gripping mechanism being connected to the robotic manipulator.

9. The apparatus of claim 8, wherein:
the gripping mechanism is a first gripping mechanism, and the grasping function is a first grasping function; and
the apparatus further comprises a second gripping mechanism connected to the robotic manipulator, the second gripping mechanism configured to grasp the item using a second grasping function comprising suction.

10. The apparatus of claim 6, wherein:
the carriage is a first carriage, and the drive unit is a first drive unit; and
the apparatus further comprises a second carriage mounted for sliding along the frame and configured to move along the frame by a second drive unit, the second proximal ends being pivotably connected to the frame via the second carriage.

11. The apparatus of claim 10, wherein:
the pair of four-bar parallelogram linkages is a first pair of four-bar parallelogram linkages; and
the apparatus further comprises a second pair of four-bar parallelogram linkages opposite the first pair of four-bar parallelogram linkages, with third proximal ends pivotably connected to the second carriage and fourth proximal ends pivotably connected to the first carriage, and second distal ends pivotably connected to the pair of fingers.

12. The apparatus of claim 10, wherein at least one of the first drive unit or the second drive unit is operable to move at least one of the first carriage or the second carriage along the frame such that:
the first carriage and the second carriage move towards each other so that the pair of fingers move towards each other;
the first carriage and the second carriage move away from each other so that the pair of fingers move away from each other; and
the first carriage and the second carriage translate together with respect to the frame so that pair of fingers maintain a substantially fixed spacing.

13. The apparatus of claim 6, wherein the frame is elongate along a first axis of the gripping mechanism, the carriage is moveable along the first axis of the frame a first distance, the pair of fingers is moveable a second distance along a second axis of the gripping mechanism that is normal to the first axis, the first distance correlated to the second distance.

14. The apparatus of claim 6, wherein each finger of the pair of fingers comprises an inward-facing surface and an outward-facing surface, the respective inward-facing surfaces facing each other, and the respective outward-facing surfaces corresponding to interior surfaces of an item container.

15. An apparatus, comprising:
a frame;
a first carriage mounted for sliding along the frame, the first carriage configured to move along the frame by a first drive unit;
a second carriage mounted for sliding along the frame, the second carriage configured to move along the frame by a second drive unit;
a first linkage, with first proximal ends pivotably connected to the first carriage and first distal ends pivotably connected to a first finger of a set of fingers; and
a second linkage, with second proximal ends pivotably connected to the second carriage and second distal ends pivotably connected a second finger of the pair of fingers, the first linkage and the second linkage being pivotably connected at a position intermediate the first and second distal ends and the first and second proximal ends,
wherein at least one of the first drive unit or the second drive unit is operable to move at least one of the first carriage or the second carriage along the frame such that:
the first carriage and the second carriage move towards each other so that the pair of fingers move towards each other;
the first carriage and the second carriage move away from each other so that the pair of fingers move away from each other; and
the first carriage and the second carriage translate with respect to the frame so that the pair of fingers maintain a substantially fixed spacing.

16. The apparatus of claim 15, further comprising a robotic manipulator, the frame connected to the robotic manipulator.

17. The apparatus of claim 16, further comprising a management device in communication with the robotic manipulator, the first drive unit, and the second drive unit, the management device configured to:

instruct the robotic manipulator to position the pair of fingers above an item; and instruct the first drive unit and the second drive unit to move the pair of fingers at least until the pair of fingers physically contact opposing sides of the item.

18. The apparatus of claim 17, wherein:

the apparatus further comprises a translating end effector; and the management device is further configured to instruct the translating end effector to translate a distal portion of the translating end effector at least until the distal portion physically contacts a top side of the item.

19. The apparatus of claim 15, wherein:

the frame, the first carriage, the second carriage, the first linkage, and the second linkage together define a first gripping mechanism configured to vertically move the pair of fingers; and the apparatus further comprises a second gripping mechanism that is aligned with the first gripping mechanism and configured to vertically move a suction head.

20. The apparatus of claim 15, further comprising one or more sensors configured to output sensor data useable to determine a force applied by the pair of fingers on an item.

\* \* \* \* \*